United States Patent [19]

Lieb

[11] Patent Number: 5,056,042

[45] Date of Patent: Oct. 8, 1991

[54] MEDIA CONDUCTIVITY-BASED PULSE CONTROLLER FOR ELECTROSTATIC PRINTER

[75] Inventor: Stephen Lieb, Brea, Calif.

[73] Assignee: Calcomp Inc., Anaheim, Calif.

[21] Appl. No.: 502,920

[22] Filed: Apr. 2, 1990

[51] Int. Cl.[5] .............................................. G06K 15/00

[52] U.S. Cl. ...................................... 364/519; 346/154

[58] Field of Search ................................ 364/518–520, 364/235 MS, 930 MS; 346/154, 155, 153.1; 361/235

[56] References Cited

U.S. PATENT DOCUMENTS

| | | | |
|---|---|---|---|
| 3,943,501 | 3/1976 | Kulka et al. | 361/235 |
| 3,943,502 | 3/1976 | Huttsmith | 361/235 |
| 4,262,294 | 4/1981 | Hara et al. | 346/154 |

*Primary Examiner*—Arthur G. Evans
*Attorney, Agent, or Firm*—Donald A. Streck

[57] ABSTRACT

This invention is a control system for controlling an electrostatic printer/plotter electrostatically generating an image on a recording media being driven by a transport motor over a plurality of image-forming electrodes by applying image writing pulses to the electrodes. There is a media sensor for sensing which one of a plurality of pre-determined media types is currently being used in the printer/plotter and a sensor for measuring a parameter related to conductivity of the media. There is also a microprocessor for determinnig from the conductivity and type of media currently being used in the printer/plotter an optimum pulse width for the image writing pulses which maintains the density of an image produced on the media by the electrodes at a maximum density and for generating images employing image writing pulses transmitted to the electrodes which are of the optimum pulse width. Pulse repetition rate and media speed are also regulated in an optimum manner.

20 Claims, 5 Drawing Sheets

MEDIA CONDUCTIVITY-BASED PULSE CONTROLLER FOR ELECTROSTATIC PRINTER

BACKGROUND OF THE INVENTION

The invention is a control system for an electrostatic plotter or printer which permits the plotter or printer to operate at optimum performance despite the use of various media types and despite variations in media conductivity due to humidity changes.

Electrostatic plotters and printers are well-known in the art and operate by longitudinally feeding a sheet of printing media underneath a transverse line of small imaging electrodes in an imaging head. Individual electrostatic pixels of an image are formed on the media by applying electrical image writing pulses to corresponding ones of the small imaging electrodes at appropriate times at the media moves under the imaging head. The media then passes a toning station where liquid toner is applied to the media. The toner is attracted to the electrostatic image on the media and forms a permanant image thereon. For high resolution images with small pixels, the image writing pulses applied to the electrodes are very short in time, on the order to microseconds. The density or darkness of the image formed on the media is proportional to the amount of charge imparted to the media under control of the electrodes. This is because the greater the electrostatic charge at a given point, the more toner is attracted thereto.

Various electrostatic printing or copying techniques are known in the art. For example, U.S. Pat. No. 4,794,422 to Lehman et al. is directed to the overall control of a xerographic process machine. U.S. Pat. No. 3,954,333 to Goel shows controlling the image transfer roller in a xerographic process machine to optimize the transfer of image-bearing toner from the roller to the media. The roller is controlled as a function of resistivity changes caused by changes in ambient temperature. The media type is not considered. U.S. Pat. No. 4,460,270 to Watai et al. concerns controlling the intensity of an exposure lamp in a xerographic process machine as a function of sensed intensity compared to optimum intensity for the conditions. U.S. Pat. No. 4,354,758 to Futaki, like the patent to Watai et al., concerns controlling the intensity of an exposure lamp in a xerographic process machine. In the patent to Futaki, the lamp intensity is controlled as a function of sensed reflected light. U.S. Pat. No. 3,781,105 to Meagher is directed to controlling the parameters of a transfer member in a xerographic process machine as a function of sensed current variations. U.S. Pat. No. 4,431,302 to Weber discloses a corona discharge system in which a corona is employed to charge a medium and the speed of the medium is changed as a function of the sensed intensity of the corona field. U.S. Pat. No. 4,395,112 to Miyakawa et al. also concerns a xerographic process machine and is directed to sensing relative humidity to control a bias voltage employed to remove background fog from the image. No consideration of the media is made.

One problem with electrostatic printers and plotters is that the image formed on the media may have longitudinal stripes formed by longitudinal regions on the media of different images densities. This is one of the manifestations of non-uniformities in charge transfer from electrode to electrode along the electrostatic image head which lead to slightly different rates of charging across the plot. The stripes or "vertical banding" of dark and light vertical stripes are due to edge effects of multiplexed groups of nib electrodes. To achieve uniform charge transfer, all nib electrodes must transfer maximum charge to completely saturate the media. If maximum charge transfer is not achieved bands become visible.

The amount of image charge is determined by the media's electrical conductivity, which depends upon the type of media used in the electrostatic printer. Furthermore, the media conductivity changes with the ambient humidity in a manner which is different for different types of media. As a result, the performance of an electrostatic printer or plotter varies with the humidity and according to the type of media used. Thus, the same electrostatic plotter may produce perfect images one day and then—with either a reduction in humidity or a change of media type—may produce striped or defective images the next day.

Such problems have been addressed in a limited fashion by attempting to seal the environment inside the electrostatic printer/plotter and regulating the humidity therein with a built-in humidifier. This approach requires the user periodically to replenish the humidifier's water supply, a task which is easily forgotten until the image quality degrades noticeably. Moreover, such an approach only addresses change in humidity and fails to provide for the different conductivities of the various media used in electrostatic printers and plotters. That is, it is a "one size fits all" solution, the effectiveness of which depends on the particular media actually in use. Thus, while the humidity may remain constant, the user may still find that the image quality degrades as soon as the media in the printer is replaced by other media having a different conductivity.

As initial investigations by the inventor herein indicated, if one charts image charge versus on-time for nib electrodes in a typical electrostatic plotter such as those made by the assignee of this application under particular conditions, image voltage will increase continuously as on-time is increased from 2 to 30 μsec. Beyond 18 μsec, however, there is little change in image voltage with increased on-time. These same plotters typically employ a 25 μsec on-time. The inventor's investigations lead to the conclusion, therefore, that the on-time could have been reduced to say 18 μsec without effecting plot quality to any appreciable degree. This 28% reduction in on-time could be translated into an increase in plotter throughput. This reduction could not be made across the board, however, as under different conditions the 18 μsec on-time might be insufficient. Thus, these plotters employ an on-time which is set for worst case conditions and suffer the loss of performance possible when conditions are less than worst case.

Thus, it will be appreciated that there is a need for an electrostatic plotters and printers which consistently provide images of the highest quality without noticeable defects (such as longitudinal stripes caused by density variations) despite changes in relative humidity and despite changes in media type or media conductivity.

Accordingly, it is an object of the invention to provide an electrostatic printer or plotter which consistently prints each pixel in an image with the maximum amount of charge at any relative humidity level (within a fairly large range) on any one of several types of dielectric media characterized by different media conductivities.

It is another object of the invention to provide a control system for an electrostatic printer or plotter which measures media conductivity and changes the image writing pulse width so as to compensate for changes in media conductivity.

It is yet another object of the invention to provide a control system for an electrostatic printer or plotter which determines the image writing pulse width from the type of media used and changes the pulse width in response to a change in media type.

It is still another object of the invention to provide a control system for an electrostatic printer or plotter which determines the type of media being used, measures media conductivity and changes the image writing pulse width in response to a change in media conductivity by different amounts for different media types, so as to compensate for changes in media conductivity while accomodating the different requirements of the different media types for different image writing pulse widths.

It is a yet further object of the invention to provide a control system for an electrostatic printer or plotter in accordance with any of the foregoing objects which measures humidity in lieu of media conductivity.

It is a still further object of the invention to provide a control system for an electrostatic printer or plotter in accordance with any of the foregoing objects which measures humidity in lieu of media conductivity and which can respond to either a media conductivity measurement or a relative humidity measurement to control the image writing pulse width.

It is a correlative object of the invention to provide a control system for an electrostatic printer or plotter in accordance with any of the objects above which changes the transport rate of the media and the pulse rate of the image writing pulse in proportion to any change in the image writing pulse width, so that the transport speed is increased to enhance throughput whenever the media conductivity is high, and so that the transport speed is decreased to maintain maximum image quality whenever the media conductivity is low.

These and other objects and benefits of the invention will become apparent in the following description of the invention when taken in conjunction with the accompanying drawings.

SUMMARY OF THE INVENTION

The foregoing objects have been achieved by the control system of the present invention for controlling an electrostatic printer/plotter electrostatically generating an image on a recording media being driven by a transport motor over a plurality of image-forming electrodes by applying image writing pulses to the electrodes comprising, media sensing means for sensing which one of a plurality of pre-determined media types is currently being used in the printer/plotter; characteristics sensing means for measuring a parameter related to conductivity of the media; memory means for storing a plurality of pre-determined functions relating a range of value of the parameter with image writing pulse widths required to achieve a maximum density of an image where the plurality of functions corresponds to the plurality of media types; and, microprocessor control means connected to the media sensing means and the characteristic sensing means for determining from the conductivity and type of media currently being used in the printer/plotter an optimum pulse width for the image writing pulses which maintains the density of an image produced on the media by the electrodes at a maximum density and for generating images employing image writing pulses transmitted to the electrodes which are of the optimum pulse width, the microprocessor control means including means for obtaining from the memory means at each possible value of the parameter one of the functions corresponding to a media type sensed as currently being used in the printer/plotter.

In the preferred embodiment, the plurality of predetermined functions relating a range of values of the parameter with image writing pulse widths stored within the memory means includes image writing pulse widths which are minimum pulse widths necessary to produce a maximum amount of image charge at a plurality of image pixel positions on the media by the electrodes at respective values of the parameter.

Also in the preferred embodiment, the characteristic sensing means comprises means for measuring conductivity of the media itself. As a non-preferred alternative, the characteristic sensing means comprises means for measuring relative humidity within a portion of the electrostatic printer/plotter wherein the media is stored.

The preferred microprocessor control means further comprises, means for computing from the optimum pulse width a corresponding optimum media speed for transporting the media past the electrodes which will maximize the through-put of the electrostatic printer/plotter; and, means connected to the transport motor for regulating the speed at which the media moves relative to the electrodes to be the optimum media speed. It further comprises, means for computing an optimum pulse repetition rate for the image writing pulses corresponding to the optimum media speed; and, means for transmitting the image writing pulses to the electrodes at the optimum pulse repetition rate whereby a constant pixel displacement between adjacent pixels is maintained on the media for a range of different media speeds.

DETAILED DESCRIPTION OF THE INVENTION

In the course of developing the present invention, the differences between various electrostatic media at the same relative humidity was investigated by varying the pulse width of the image writing pulses applied to the imaging electrodes of an electrostatic printer and observing the corresponding changes in image charge for each type of media. As a result of these investigations it was found that, generally, the longer the pulse width applied to an imaging electrode, the more charge accumulates in the corresponding pixel on the media until the maximum amount of charge has accumulated. The results of this investigation are illustrated in FIGS. 1 through 5, in which the image charge (expressed in terms of an image voltage) is plotted as a function of the image writing pulse width for various types of dielectric media labelled, respectively, CLEAR, ADR, VDR, EDR and TDR. These plots show that the maximum image charge is achieved at different threshold pulse widths for different media. For example, the CLEAR media requires an image writing pulse width of around 6 microseconds to accumulate a maximum image charge while the TDR media requires an image writing pulse width of around 20 microseconds. Such differences are attributable to the different conductivities of the various media. The relative humidity was 50% for each case. These figures illustrate how replacement of one media type with another in an electrostatic plotter or printer can cause a noticable change image pixel density and, therefore, in image quality.

Additionally, the effect of changes in humidity was investigated by varying the pulse width of the image writing pulses applied to the imaging electrodes of an electrostatic plotter and observing changes in image charge at various levels of humidity on the same media type. It was found that, generally, as the humidity was decreased, image charge accumulated more slowly and therefore the pulse width required to accumulate the maximum amount of charge increased. Such changes are attributable to the fact that media conductivity increases whenever the relative humidity increases. The results of this investigation are illustrated in FIGS. 6 through 9, in which image charge on the media (expressed in terms of image voltage) is plotted as a function of image writing pulse width for ADR media at relative humidities of 60%, 50%, 40% and 30% respectively. These figures shows how a change in relative humidity can cause a noticeable change in image pixel density and, therefore, in image quality. A decrease in image pixel density can cause the above-described longitudinal density stripes in the image.

Figure 1:
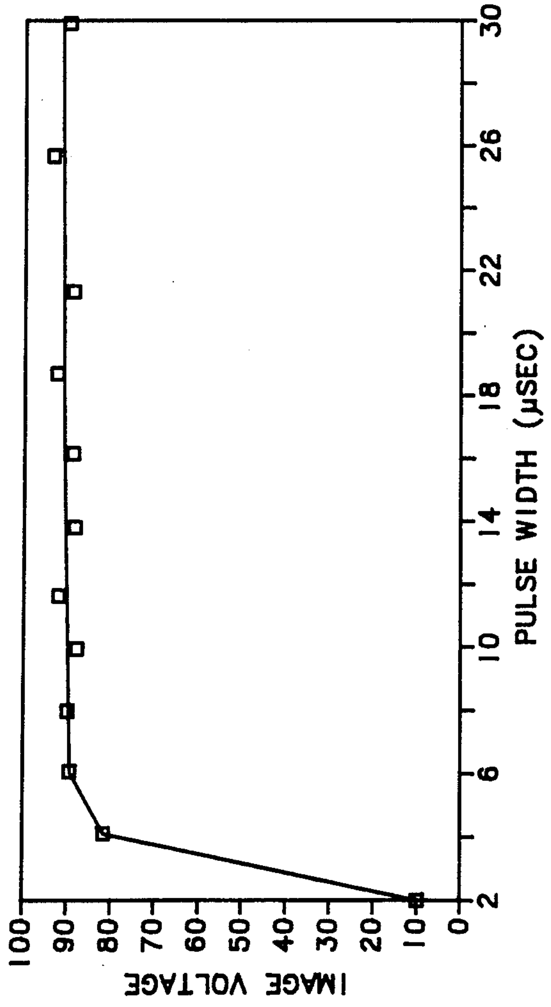
FIG. 1 is a graph depicting image voltage versus pulse width in μsec for clear film media at 50% relative humidity.
Figure 2:
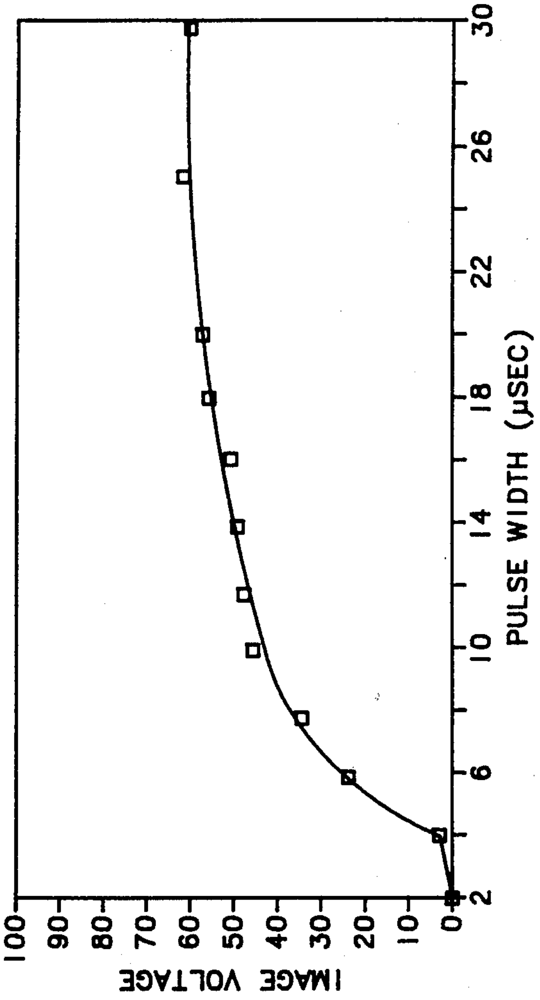
FIG. 2 is a graph depicting image voltage versus pulse width in μsec for ADR media at 50% relative humidity.
Figure 3:
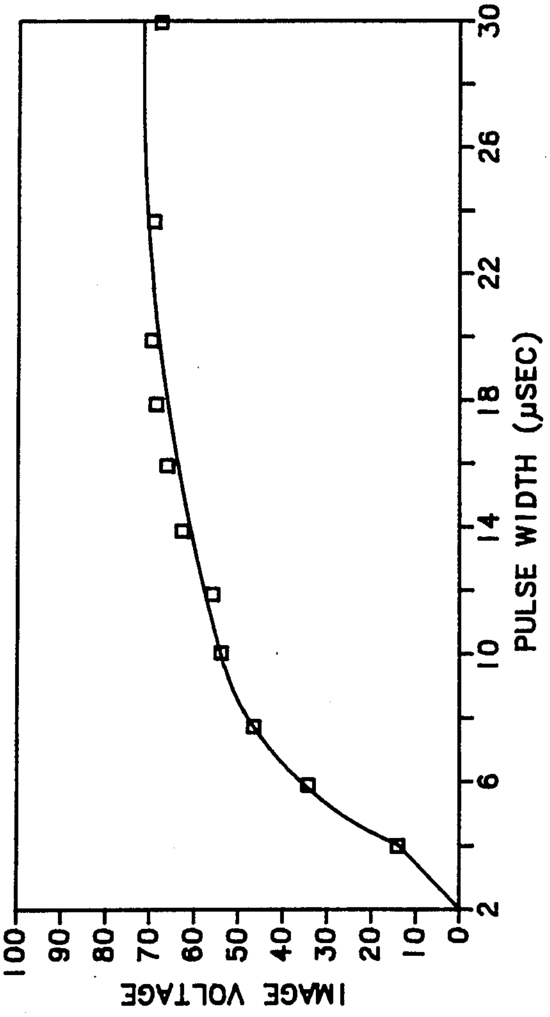
FIG. 3 is a graph depicting image voltage versus pulse width in μsec for EDR media at 50% relative humidity.
Figure 4:
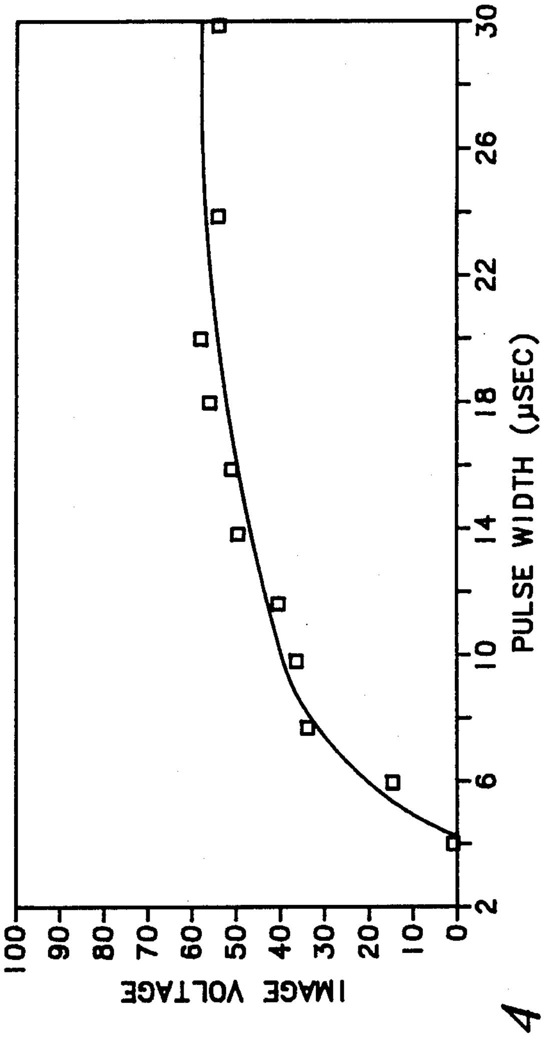
FIG. 4 is a graph depicting image voltage versus pulse width in μsec for VDR media at 50% relative humidity.
Figure 5:
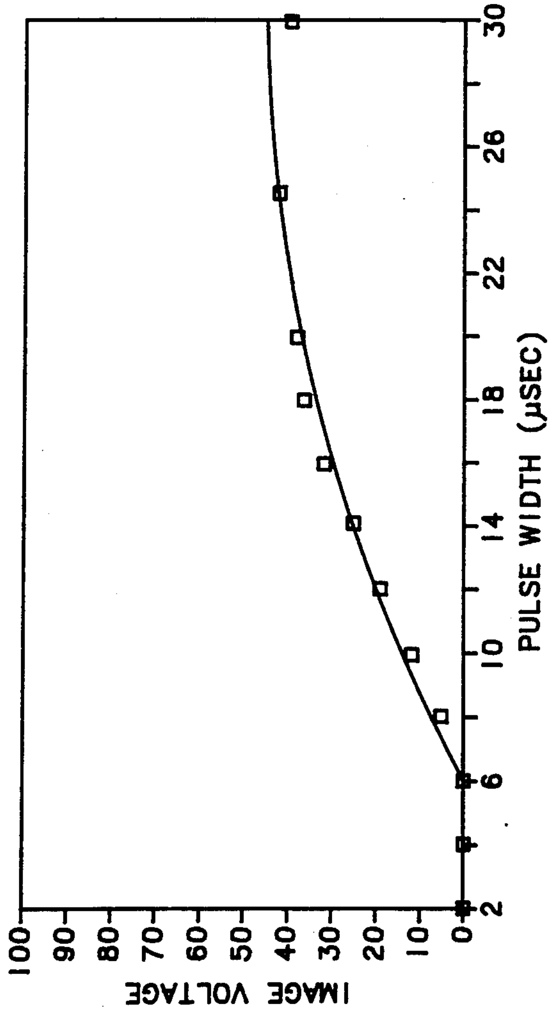
FIG. 5 is a graph depicting image voltage versus pulse width in μsec for TDR media at 50% relative humidity.
Figure 6:
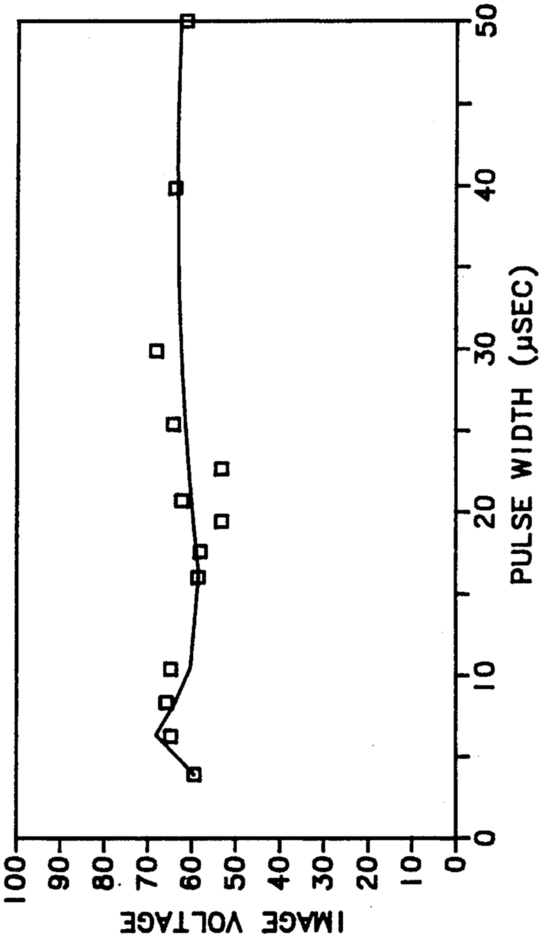
FIG. 6 is a graph depicting the response of the image voltage to electrode on-time (i.e. pulse width in μsec) for ADR media at 60% relative humidity.
Figure 7:
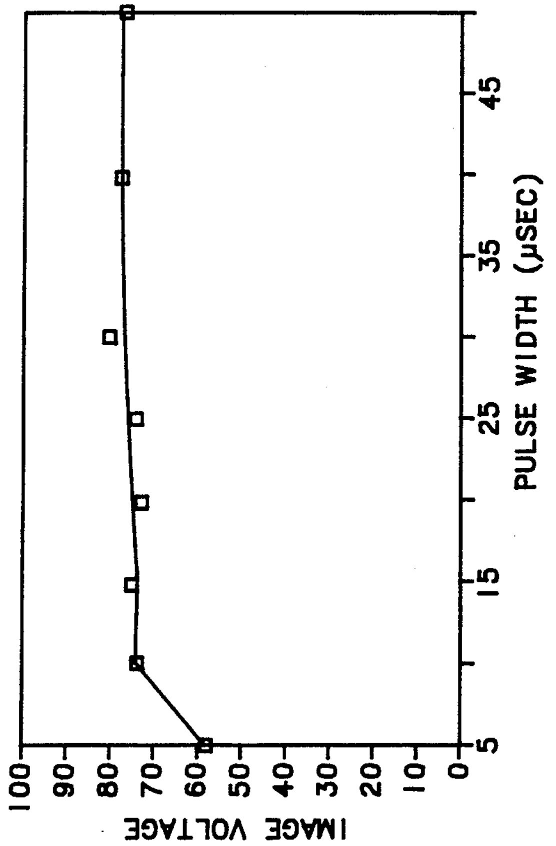
FIG. 7 is a graph depicting the response of the image voltage to electrode on-time (i.e. pulse width in μsec) for ADR media at 50% relative humidity.
Figure 8:
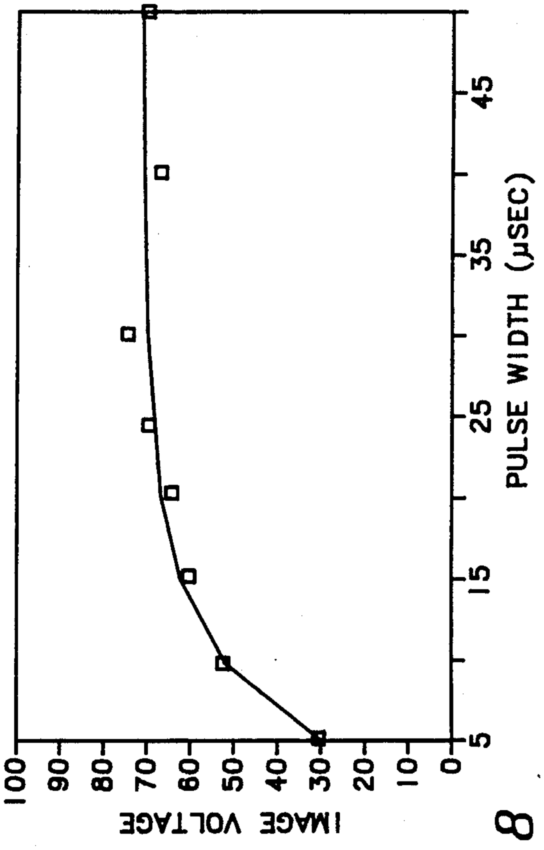
FIG. 8 is a graph depicting the response of the image voltage to electrode on-time (i.e. pulse width in μsec) for ADR media at 40% relative humidity.
Figure 9:
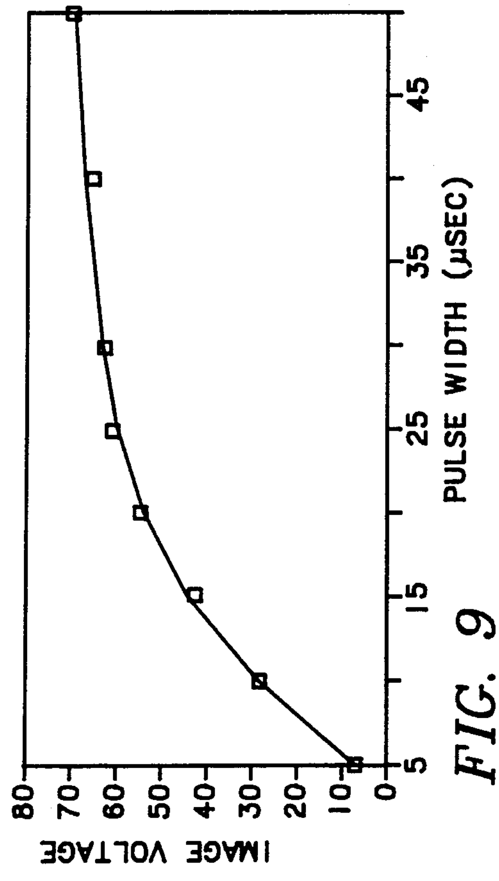
FIG. 9 is a graph depicting the response of the image voltage to electrode on-time (i.e. pulse width in μsec) for ADR media at 30% relative humidity.
Figure 10:
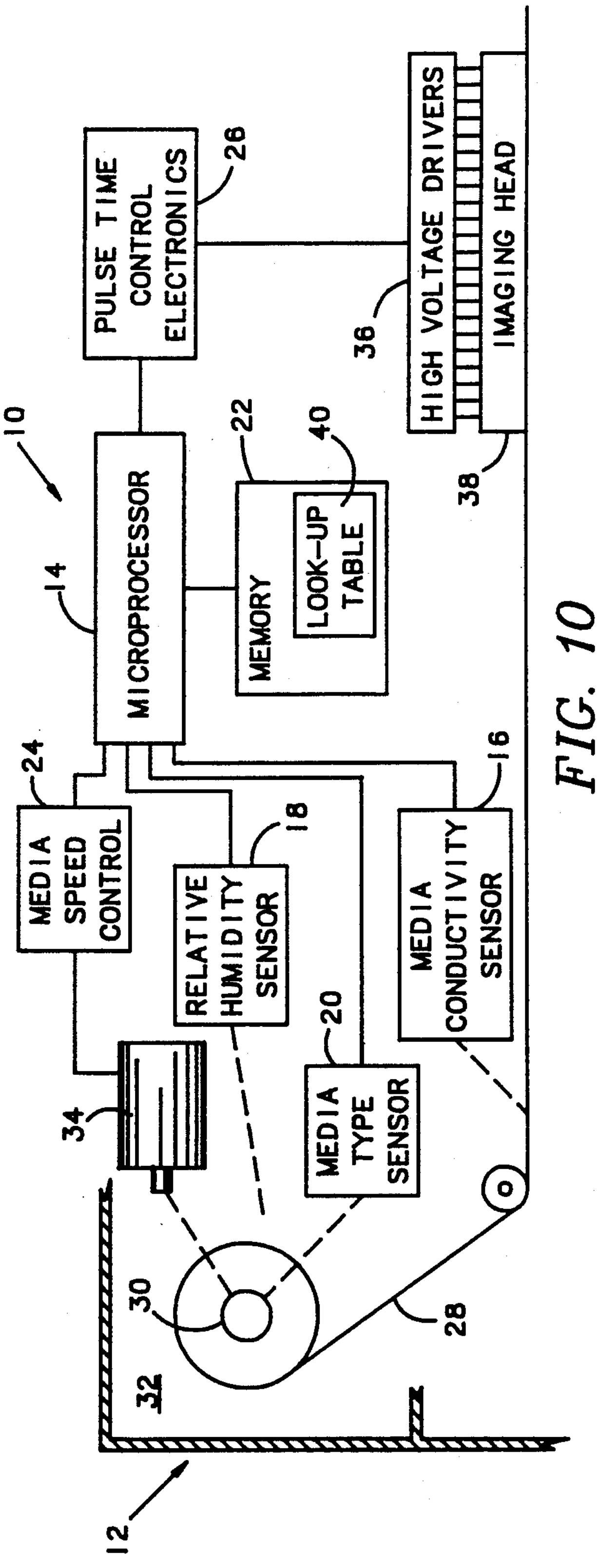
FIG. 10 is a functional block diagram of a control system for an electrostatic printer or plotter according to a preferred embodiment of the present invention.

FIG. 10 is a simplified functional block diagram illustrating a preferred embodiment of the control system 10 of the invention which resides in an electrostatic printer/plotter 12. The preferred control system 10 includes a microprocessor 14 connected to receive input data from a media conductivity sensor 16 (of a type well-known in the art), a relative humidity sensor 18 (of a type also well-known in the art), a media type sensor 20, and a memory 22. The microprocessor 14 is also connected to output data to a media speed control 24 and pulse control electronics 26. The microprocess 14, while shown as a separate item, could, of course, comprise part of the microprocessor capability incorporated into virtually all contemporary printers and plotters. The media type sensor 20 senses which one of a plurality of media types corresponds to the media 28 currently being used in the printer/plotter 12. It may be a sensor which can read marks on the core 30 supporting the roll of media 28 as described in co-pending application Ser. No. 07/498,217, filed Mar. 22, 1990, now abandoned, and entitled AUTOMATIC PRINTER/PLOTTER MEDIA TYPE DETECTION SYSTEM by Allan Avnet, which is assigned to the common assignee of this application. The marks may be a bar code, a keyed array of notches, an electronic marking, a magnetic marking, or the like. Alternatively but not preferred, the sensor 20 can respond to a multi-position switch manually set by a user in accordance with the type of media 28 loaded in the printer/plotter 12. As those skilled in the art will readily recognize and appreciate, the output of the conductivity sensor 16 (which is connected to sense the conductivity of the media 28) and the output of the humidity sensor 18 (which senses the relative humidity within an enclosure 32 of the printer/plotter 12 holding the roll of media 28) must be converted to digital data as by use of an analog to digital converter. The media speed control 24 controls the speed of a media transport motor 34 connected to transport the media 28 while the pulse control electronics 26 control the pulse width and rate of high voltage image writing pulses delivered by the high voltage drivers 36 to image writing electrodes (not shown) contained in the imaging head 38.

In use, the microprocessor 14 determines from the media conductivity sensor 16 the electrical conductivity of the media 28 and determines the type of the presently-loaded media 28 from the media type sensor 20. The media conductivity sensor 16 determines the response of the media 28 to the current environmental conditions within the printer/plotter 12 at the time the plot is made. By actively sensing media conditions, optimum on-time can be constantly adjusted to guarantee good plot quality even under varying environmental conditions. The memory 22 contains a previously-loaded look-up table 40 for each possible type of media 28. The data of the look-up table 40 is, of course, easily determined according to techniques well known to those skilled in the art without undue experimentation. It is substantially that data reported by the inventor herein with respect to FIGS. 1–9; that is, one simply has to measure the parameters in a simple laboratory test set-up and then program the parameters into the memory 22. The look-up table 40 relates the sensed conductivity value to the optimum image writing pulse width—i.e., the minimum pulse width which produces the maximum image charge in each pixel on the media 28. The contents of the look-up table 40 also reflects the manner in which the optimum pulse width value changes with a change in conductivity value for each media type. The microprocessor 14 accesses the appropriate look-up table data in the memory 22 and fetches the appropriate pulse width value for the particular media at the conductivity sensed. From this pulse width value, the microprocessor 14 computes the appropriate media speed and image writing pulse repetition rate. The microprocessor 14 then transmits both a pulse width and pulse repetition rate to the pulse control electronics 26 and transmits a media speed control value to the media speed control 24 so as to take full and best advantage of the currently employed on-time (i.e. pulse width) and pulse repetition rate.

If the media conductivity sensor 16 is not available or is not selected, the microprocessor 14 can obtain a relative humidity value from the humidity sensor 18 in lieu of a media conductivity value and employ the humidity value to fetch the optimum pulse width value from the look-up table 40 in the memory 22. It should be noted, however, that both the media conductivity sensor 16 and the humidity sensor 18 are not necessary simultaneously to the objects of the invention. Use of the media conductivity sensor 16 is preferred since it provides actual media performance data under current conditions while the emperical data employed with the humidity sensor 18 will suffice when the preferred source of data is unavailable.

Having thus described the invention, what is claimed is:

1. A method for controlling an electrostatic printer/plotter which is electrostatically generating an image on a recording media moving over a plurality of image-forming electrodes by applying image writing pulses to the electrodes, said method comprising the steps of:

a) sensing which one of a plurality of pre-determined media types is currently being used in the printer/plotter;

b) measuring a parameter related to conductivity of the media;

c) determining from the conductivity and the media type an optimum pulse width for the image writing pulses which maintains the density of an image produced on the media by the electrodes at a maximum density; and d) generating images employing image writing pulses transmitted to the electrodes which are of the optimum pulse width.

2. The method of claim 1 and further comprising the step of:

a) storing a plurality of pre-determined functions relating a range of values of the parameter with image writing pulse widths required to achieve a maximum density of an image where the plurality of functions corresponds to the plurality of media types; and wherein additionally, b) said step of determining an optimum pulse width comprises evaluating at the value of the parameter found during said step of measuring a parameter related to conductivity of the media one of the functions corresponding to the media type sensed.

3. The method of claim 2 wherein said step of storing a plurality of pre-determined functions relating a range of values of the parameter with image writing pulse widths includes the step of:

storing imaging writing pulse widths which are the minimum pulse widths necessary to produce a maximum amount of image charge at a plurality of image pixel positions on the media by the electrodes at respective values of the parameter.

4. The method of claim 1 wherein said step of measuring a parameter related to conductivity of the media comprises:

measuring the conductivity of the media itself.

5. The method of claim 1 wherein said step of measuring a parameter related to conductivity of the media comprises:

measuring the relative humidity within a portion of the electrostatic printer/plotter wherein the media is stored.

6. The method of claim 1 and further comprising the steps of:

a) computing from the optimum pulse width a corresponding optimum media speed for transporting the media past the electrodes which will maximize the through-put of the electrostatic printer/plotter; and, b) regulating the speed at which the media moves relative to the electrodes to be the optimum media speed.

7. The method of claim 6 and further comprising the step of:

a) computing an optimum pulse repetition rate for the image writing pulses corresponding to the optimum media speed; wherein additionally, b) said step of generating images employing image writing pulses transmitted to the electrodes includes the step of transmitting the image writing pulses to the electrodes at the optimum pulse repetition rate whereby a constant pixel displacement between adjacent pixels is maintained on the media for a range of different media speeds.

8. A control system for controlling an electrostatic printer/plotter electrostatically generating an image on a recording media being driven by a transport motor over a plurality of image-forming electrodes by applying image writing pulses to the electrodes, said control system comprising:

a) media sensing means for sensing which one of a plurality of pre-determined media types is currently being used in the printer/plotter;

b) characteristic sensing means for a measuring a parameter related to conductivity of the media; and, c) control means connected to said media sensing means and said characteristic sensing means for determining from the conductivity and type of media currently being used in the printer/plotter an optimum pulse width for the image writing pulses which maintains the density of an image produced on the media by the electrodes at a maximum density and for generating images employing image writing pulses transmitted to the electrodes which are of said optimum pulse width.

9. The control system of claim 8 and further comprising:

a) memory means for storing a plurality of pre-determined functions relating a range of value of the parameter with image writing pulse widths required to achieve a maximum density of an image where said plurality of functions corresponds to the plurality of media types; and wherein additionally, b) said control means includes means for obtaining from said memory means at each possible value of said parameter one of said functions corresponding to a media type sensed as currently being used in the printer/plotter.

10. The control system of claim 9 wherein said plurality of pre-determined functions relating a range of values of said parameter with image writing pulse widths stored within said memory means includes:

image writing pulse widths which are minimum pulse widths necessary to produce a maximum amount of image charge at a plurality of image pixel positions on the media by the electrodes at respective values of said parameter.

11. The control system of claim 8 wherein said characteristic sensing means comprises:

means for measuring conductivity of the media itself.

12. The control system of claim 8 wherein said characteristic sensing means comprises:

means for measuring the relative humidity within a portion of the electrostatic printer/plotter wherein the media is stored.

13. The control system of claim 8 wherein said control means further comprises:

a) means for computing from said optimum pulse width a corresponding optimum media speed for transporting the media past the electrodes which will maximize the through-put of the electrostatic printer/plotter; and, b) means connected to the transport motor for regulating the speed at which the media moves relative to the electrodes to be said optimum media speed.

14. The control system of claim 13 wherein said control means further comprises:

a) means for computing an optimum pulse repetition rate for the image writing pulses corresponding to said optimum media speed; and, b) means for transmitting the image writing pulses to the electrodes at the optimum pulse repetition rate whereby a constant pixel displacement between adjacent pixels is maintained on the media for a range of different media speeds.

15. A control system for controlling an electrostatic printer/plotter electrostatically generating an image on a recording media being driven by a transport motor over a plurality of image-forming electrodes by applying image writing pulses to the electrodes, said control system comprising:

a) media sensing means for sensing which one of a plurality of pre-determined media types is currently being used in the printer/plotter;

b) characteristic sensing means for a measuring a parameter related to conductivity of the media; and, c) memory means for storing a plurality of pre-determined functions relating a range of values of said parameter with image writing pulse widths required to achieve a maximum density of an image where said plurality of functions corresponds to said plurality of media types; and, d) microprocessor control means connected to said media sensing means and said characteristic sensing means for determining from the conductivity and type of media currently being used in the printer/plotter an optimum pulse width for the image writing pulses which maintains the density of an image produced on the media by the electrodes at a maximum density and for generating images employing image writing pulses transmitted to the electrodes which are of said optimum pulse width, said microprocessor control means including means for obtaining from said memory means at each possible value of said parameter one of said functions corresponding to a media type sensed as currently being used in the printer/plotter.

16. The control system of claim 15 wherein said plurality of pre-determined functions relating a range of values of said parameter with image writing pulse widths stored within said memory means includes:

image writing pulse widths which are minimum pulse widths necessary to produce a maximum amount of image charge at a plurality of image pixel positions on the media by the electrodes at respective values of said parameter.

17. The control system of claim 15 wherein said characteristic sensing means comprises:

means for measuring conductivity of the media itself.

18. The control system of claim 8 wherein said characteristic sensing means comprises:

means for measuring the relative humidity within a portion of the electrostatic printer/plotter wherein the media is stored.

19. The control system of claim 15 wherein said microprocessor control means further comprises:

a) means for computing from said optimum pulse width a corresponding optimum media speed for transporting the media past the electrodes which will maximize the through-put of the electrostatic printer/plotter; and, b) means connected to the transport motor for regulating the speed at which the media moves relative to the electrodes to be said optimum media speed.

20. The control system of claim 19 wherein said microprocessor control means further comprises:

a) means for computing an optimum pulse repetition rate for the image writing pulses corresponding to said optimum media speed; and, b) means for transmitting the image writing pulses to the electrodes at the optimum pulse repetition rate whereby a constant pixel displacement between adjacent pixels is maintained on the media for a range of different media speeds.

* * * * *